(12) United States Patent
Ting

(10) Patent No.: US 6,902,047 B2
(45) Date of Patent: Jun. 7, 2005

(54) RATCHET DEVICE COMPRISING TWO SETS OF SYMMETRICAL PAWLS TO ENHANCE TORSION THEREOF

(76) Inventor: Hwang Ting, No.52, Lane 197, Jhongshan N. Rd., Daya, Taichung (TW)

( * ) Notice: Subject to any disclaimer, the term of this patent is extended or adjusted under 35 U.S.C. 154(b) by 0 days.

(21) Appl. No.: 10/671,918

(22) Filed: Sep. 24, 2003

(65) Prior Publication Data

US 2005/0061598 A1 Mar. 24, 2005

(51) Int. Cl.[7] .............................................. B25B 13/46

(52) U.S. Cl. ...................................... 192/43.2; 81/63.1

(58) Field of Search ........................... 192/43.2, 44, 45, 192/71, 107 T, 108; 81/60, 61, 62, 63, 63.1, 81/63.2

(56) References Cited

U.S. PATENT DOCUMENTS

| | | | | |
|---|---|---|---|---|
| 4,458,795 A | * | 7/1984 | Norton | 192/43.2 |
| 4,588,060 A | * | 5/1986 | Norton | 192/43.2 |
| 5,056,635 A | * | 10/1991 | Grimsley | 192/43.2 |
| 5,362,293 A | * | 11/1994 | Romanauskas | 494/84 |
| 5,404,773 A | * | 4/1995 | Norville | 81/63.1 |
| 6,644,147 B1 | * | 11/2003 | Huang | 81/62 |

* cited by examiner

Primary Examiner—Saul Rodriguez
(74) Attorney, Agent, or Firm—W. Wayne Liauh

(57) ABSTRACT

A ratchet device comprises a control body, a ratchet body, and a ratchet shifter. The control body is provided with two sets of arresting members symmetrical to each other. The ratchet body is provided with a toothed portion which is engaged with two of the four arresting members at the time when the control body is turned clockwise or counterclockwise, thereby resulting in enhancement of torsion and stability of the ratchet body. The tooth number of the toothed portion of the ratchet body can be so increased as to enhance maneuverability of the ratchet device, without compromising the torsion of the ratchet body.

9 Claims, 25 Drawing Sheets

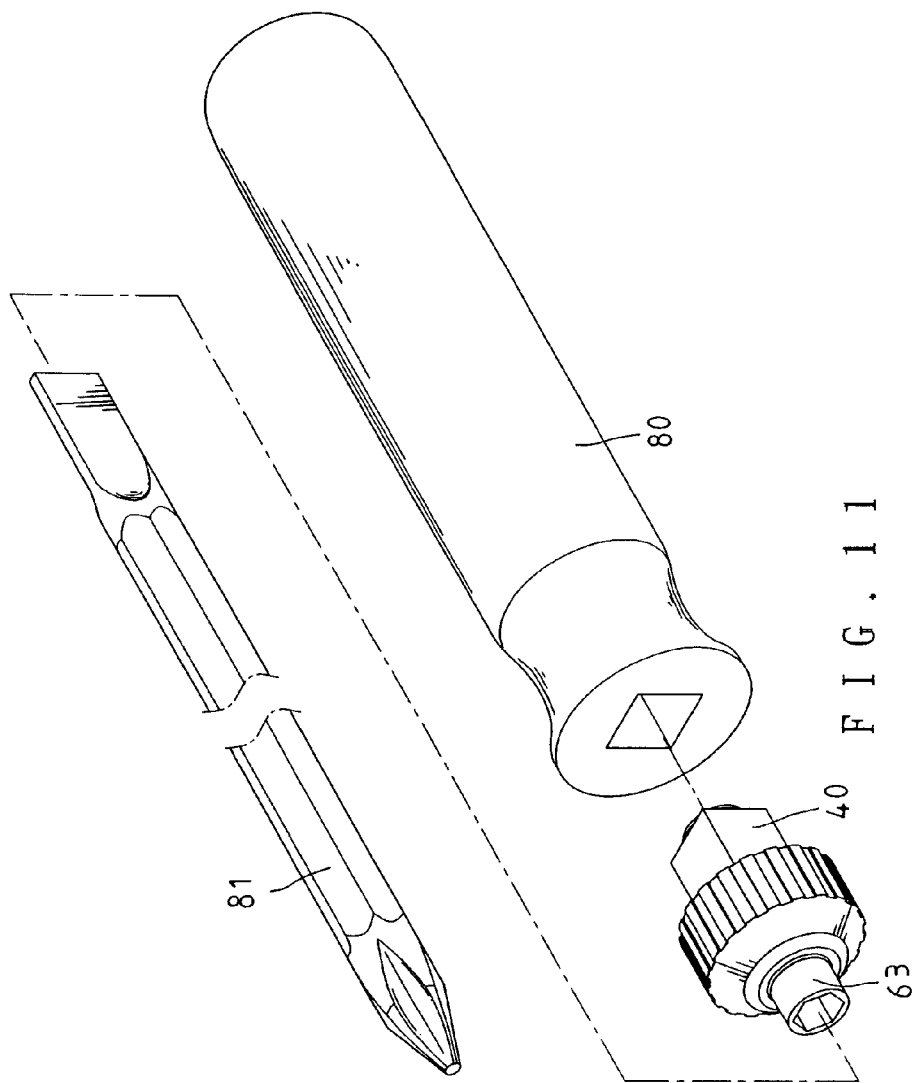

RATCHET DEVICE COMPRISING TWO SETS OF SYMMETRICAL PAWLS TO ENHANCE TORSION THEREOF

FIELD OF THE INVENTION

The present invention relates generally to a ratchet device, and more particularly to a ratchet device comprising two sets of symmetrical pawls to provide ratchet wheel thereof with symmetrical arresting forces.

BACKGROUND OF THE INVENTION

The ratchet device is widely used in hand tools, such as ratchet screwdriver, socket wrench, etc. As shown in FIGS. 1A, 1B, and 1C, a ratchet device of the prior art comprises a control body 10 which is connected with a tool handle and is provided with two arresting blocks 12A and 12A, each having a spring 11. The prior art ratchet device further comprises a ratchet main body 13 with a plurality of teeth 14. The ratchet main body 13 is fastened with a blade of the tool such that the teeth 14 are engageable with the arresting blocks 12A and 12B. The two arresting blocks 12A and 12B are engaged with the teeth 14, as shown in FIG. 1A. When the second arresting block 12B is caused by a ratchet shifter to become disengaged with the teeth 14, as shown in FIG. 2B, the control body 10 depends on the first arresting block 12A to allow the ratchet main body 13 to turn clockwise. As the control body 10 is turned in reverse, the teeth 14 of the ratchet main body 13 force out the first arresting block 12A which is thus disengaged with the first arresting block 12A, as shown in FIG. 1C. Meanwhile, the control body 10 can depend on the second arresting block 12B to allow a counterclockwise rotation of the ratchet main body 13. Similarly, as the control body 10 is turned in reverse, the second arresting block 12B is forced out by the teeth 14 of the ratchet main body 13. The prior art ratchet device described above is structurally deficient. As shown in FIGS. 2A and 2B, there is a gap between the control body 10 and the ratchet main body 13. In light of the gap, the control body 10 tends to move aside when the control body 10 is turned. As a result, the first arresting block 12A is not fully engaged with the teeth 14. Such a partial engagement of the first arresting block 12A with the teeth 14 results in an insufficient torsion. The same is true with the second arresting block 12B, as illustrated in FIG. 2B.

As shown in FIG. 3A, the tooth number of the teeth 14 of the ratchet main body 13 is twenty. As the control body 10 is turned in reverse, the control body 10 is turned in reverse an angle of 18 degrees, so as to move from one tooth 14 to another tooth 14. It is therefore apparent that the ratcheting stroke is limited in a confined space of thirty degrees. If the tooth number of the teeth 14 of the racket main body 13 is increased from 20 to 30, as illustrated in FIG. 3B, the control body 10 can move past two teeth (24 degrees) in the confined space of 30 degrees when the control body 10 is turned in reverse for an angle of 12 degrees. As a result, the ratcheting stroke is relatively increased. However, the depth of notches of the teeth 14 of the ratchet main body 13 becomes relatively shallow as a result of an increase in number of the teeth 14. It is readily conceivable that the first arresting block 12A does not engage securely with the shallow notches of the toothed ratchet main body 13. In another words, the first arresting block 12A is vulnerable to disengagement with the shallow notches of the teeth 14, as illustrated in FIG. 3C.

As shown in FIGS. 4A, 4B, and 4C, the Taiwan Patent Serial Number 88218399 discloses a ratchet screwdriver comprising a control body 20 and a ratchet body 23 with teeth 24. The control body 20 is provided therein with two arresting blocks 21A and 21B, which are confined by means of an elastic coil 22. The two arresting blocks 21A and 21B are engageable with the teeth 24 of the ratchet body 23. The control body 20 is further provided with a shifter 25 having a shifting block 26. In operation, only one arresting block is engaged with the toothed ratchet body 23. As a result, this prior art ratchet screwdriver is incapable of providing a sufficient torsion to bring about rotation of a screw which is securely fastened onto an object.

As shown in FIGS. 5A, 5B, and 5C, the Taiwan Patent Serial Number 91220384 discloses a ratchet handle structure comprising a control body 30 and a ratchet body 33 with teeth 34. The control body 30 is provided with two rotatable arresting blocks 31A and 31B, which are urged by a spring 32. The two arresting blocks 31A and 31B are engageable with the teeth 34 of the ratchet body 33 and are controlled by a shifter by which the arresting blocks 31A and 31B can be caused to disengage the teeth 34. In operation, only one arresting block is engaged with the toothed ratchet body 33. As a result, the ratchet handle structure is ineffective in providing a sufficient torsion.

SUMMARY OF THE INVENTION

The primary objective of the present invention is to provide a ratchet device with two sets of symmetrical pawls for enhancing the torsion of the ratchet device.

The ratchet device comprises a control body, a ratchet body, and a ratchet shifter. The control body is provided with two sets of symmetrical pawls engageable with the notches of the ratchet body. As the control body is turned clockwise or counterclockwise, the symmetrical pawls of one of the two sets are simultaneously engaged with the notches of the ratchet body. As a result, the torsion of the ratchet body is enhanced. In addition, the tooth number of the ratchet body can be increased to give an added stroke to the ratchet device.

The features and the advantages of the present invention will be more readily understood upon a thoughtful deliberation of the following detailed description of the preferred embodiments of the present invention with reference to the accompanying drawings.

BRIEF DESCRIPTION OF THE DRAWINGS

FIG. 11 shows a schematic view of a ratchet screwdriver in conjunction with the first preferred embodiment of the present invention.

DETAILED DESCRIPTION OF THE PREFERRED BEMBODIMENTS

Figure 1A:
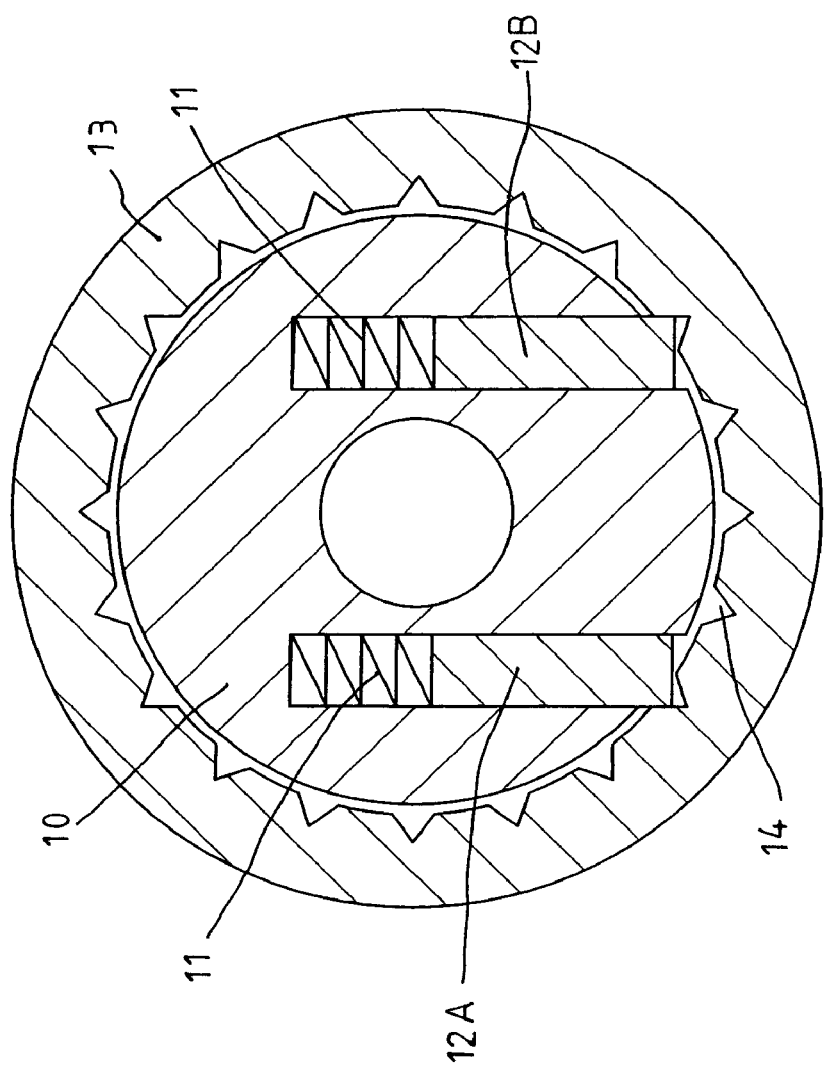
FIGS. 1A–1C are schematic views of a prior art ratchet device at work.
Figure 1B:
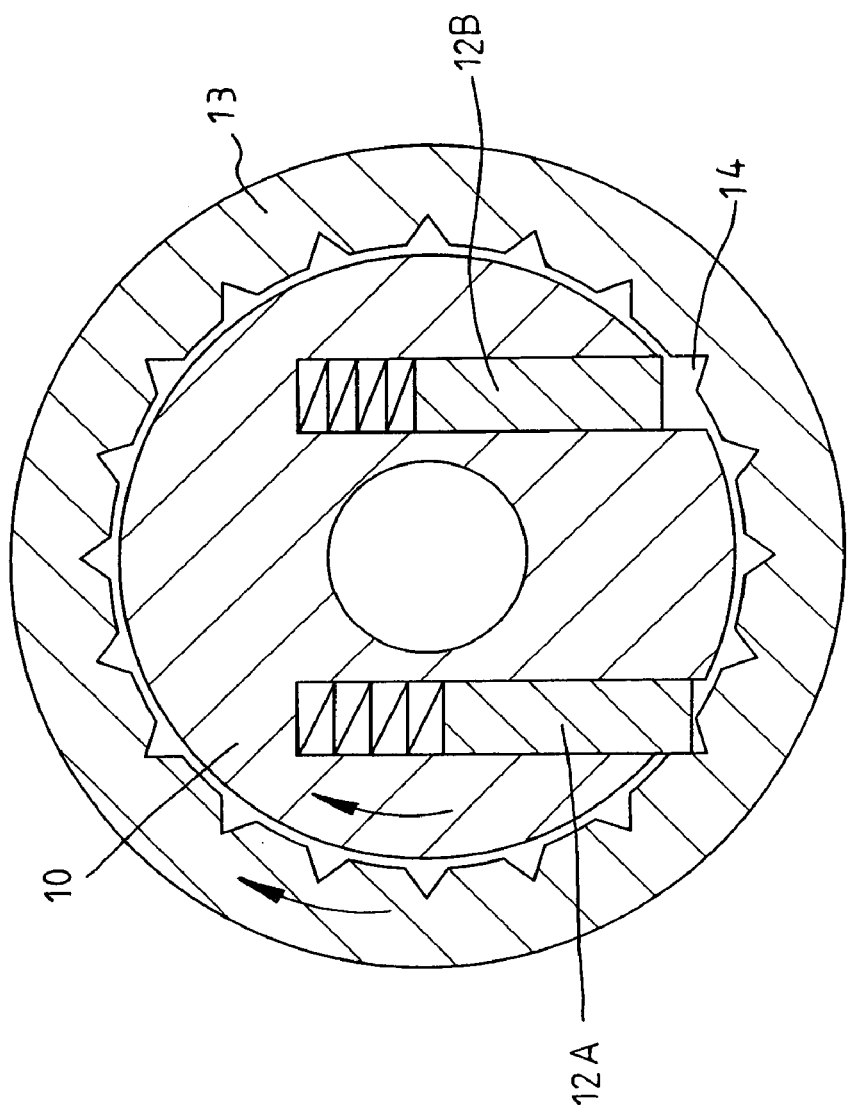
Figure 1C:
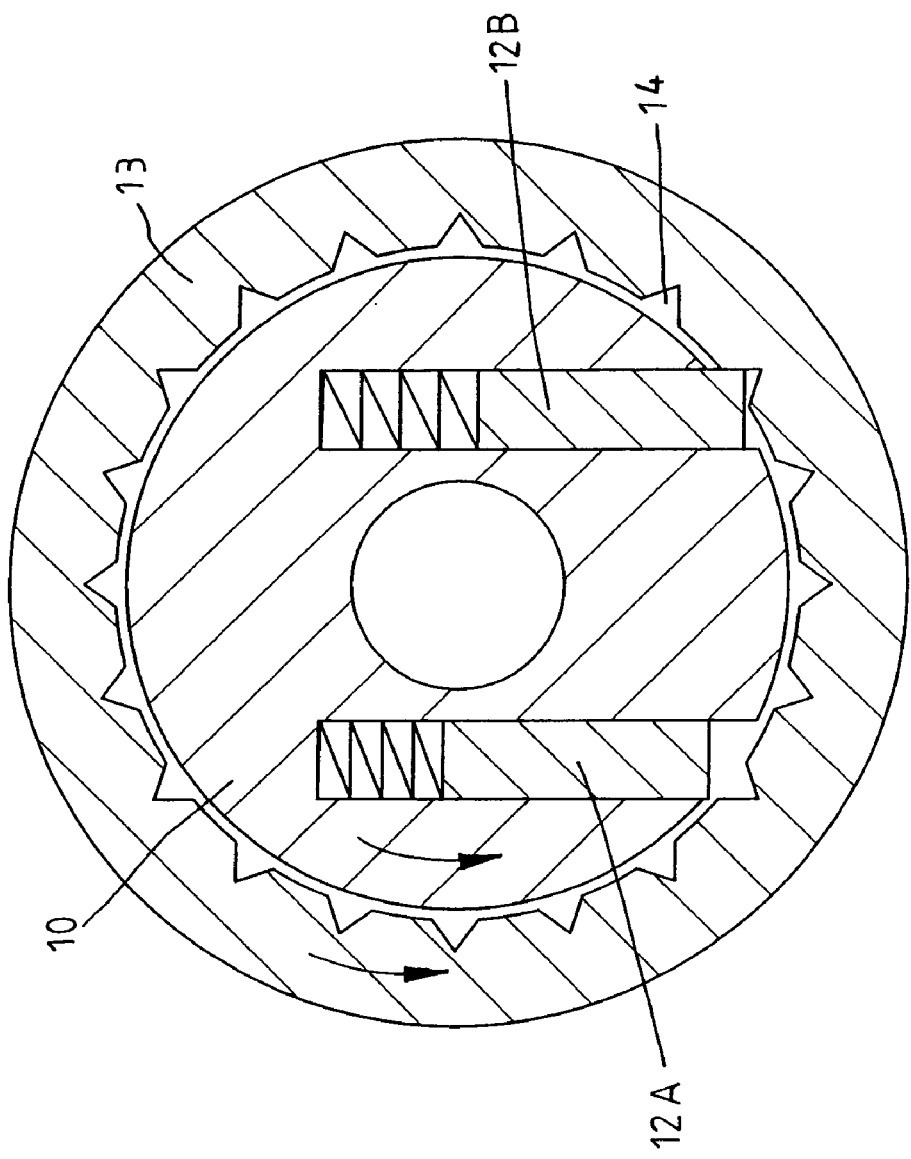
Figure 2A:
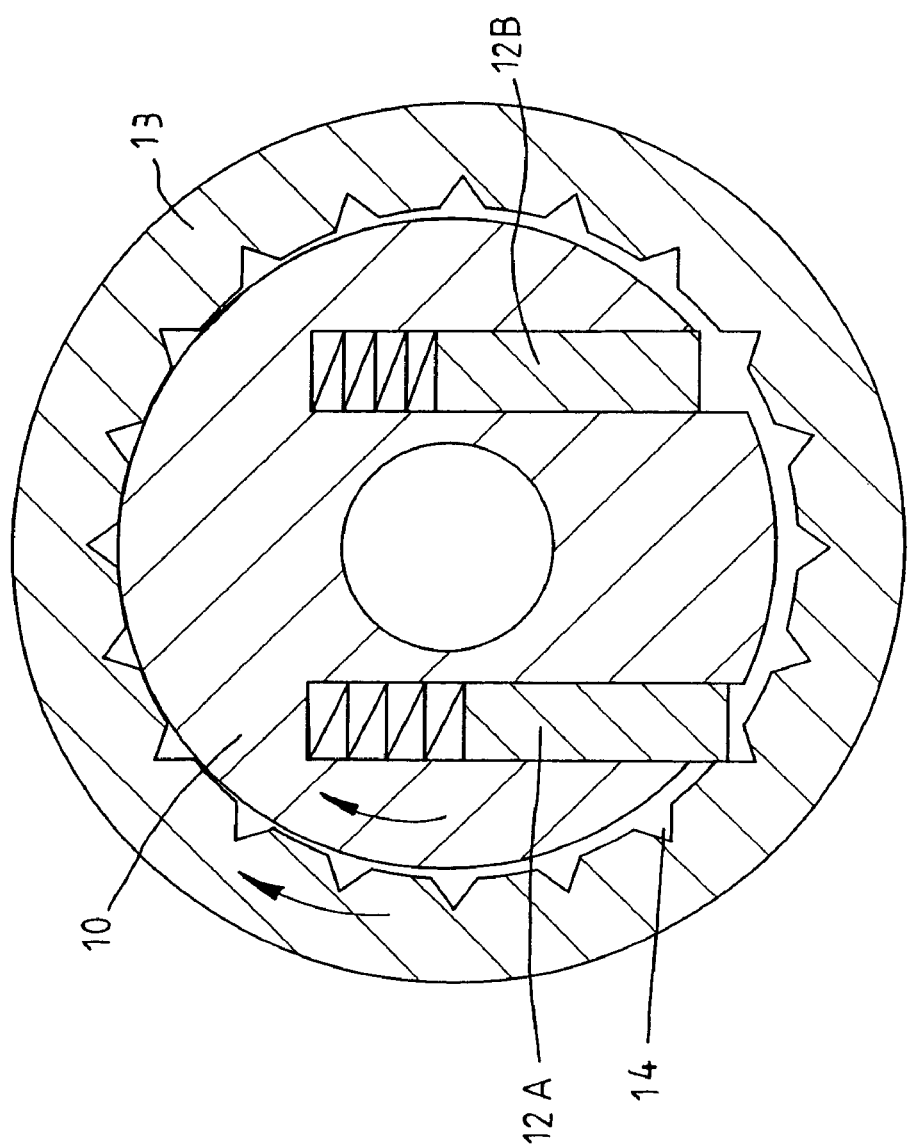
FIG. 2A shows a schematic view of the prior art ratchet device in clockwise operation.
Figure 2B:
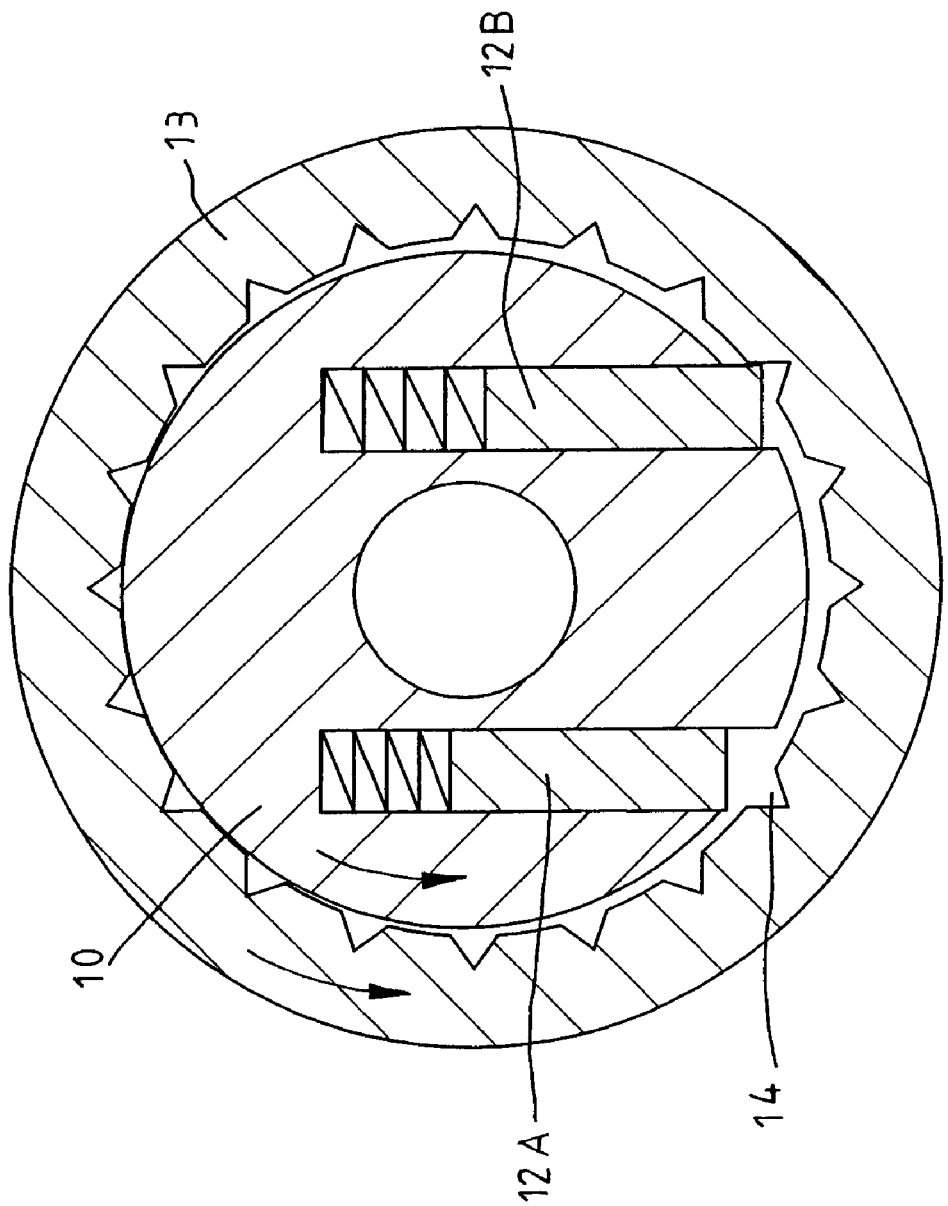
FIG. 2B shows a schematic view of the prior art ratchet device in counterclockwise operation.
Figure 3A:
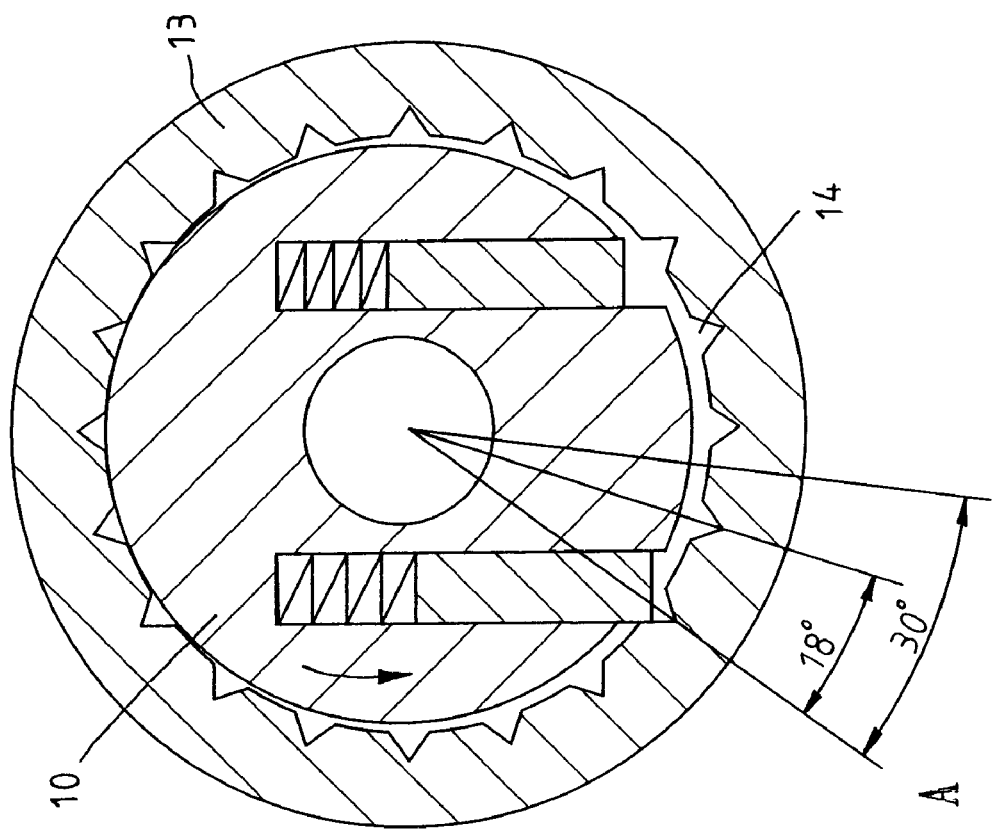
FIGS. 3A and 3B are schematic views of the ratchet main body of the prior art ratchet device in counterclockwise operation.
Figure 3B:
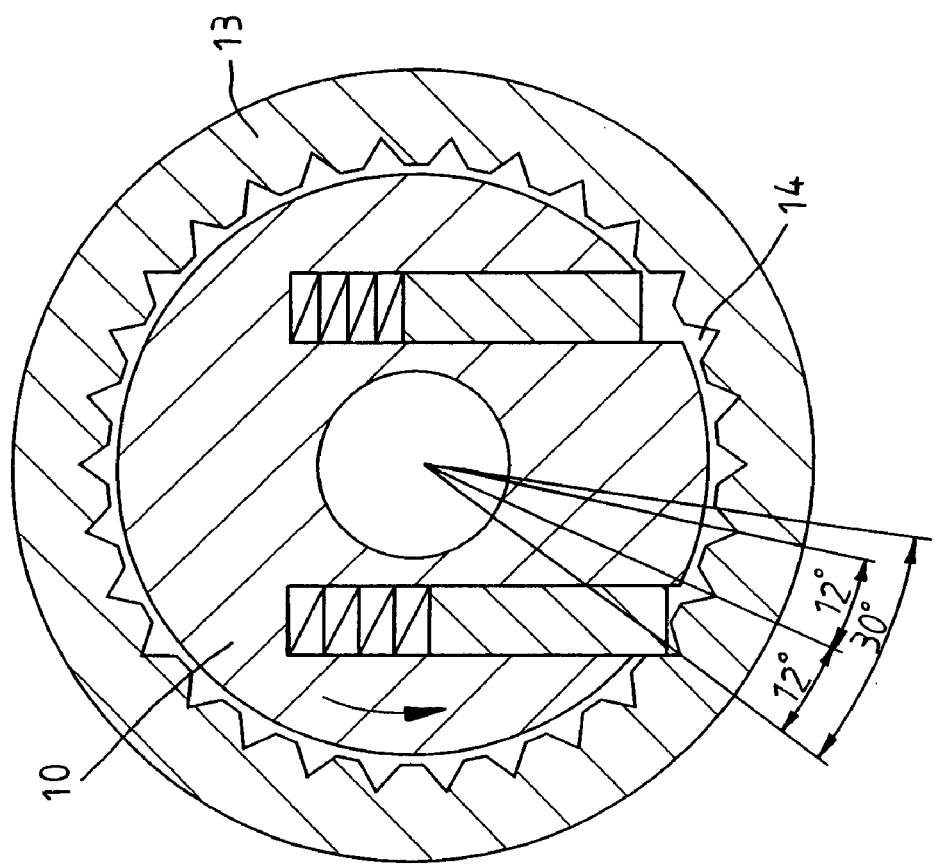
Figure 3C:
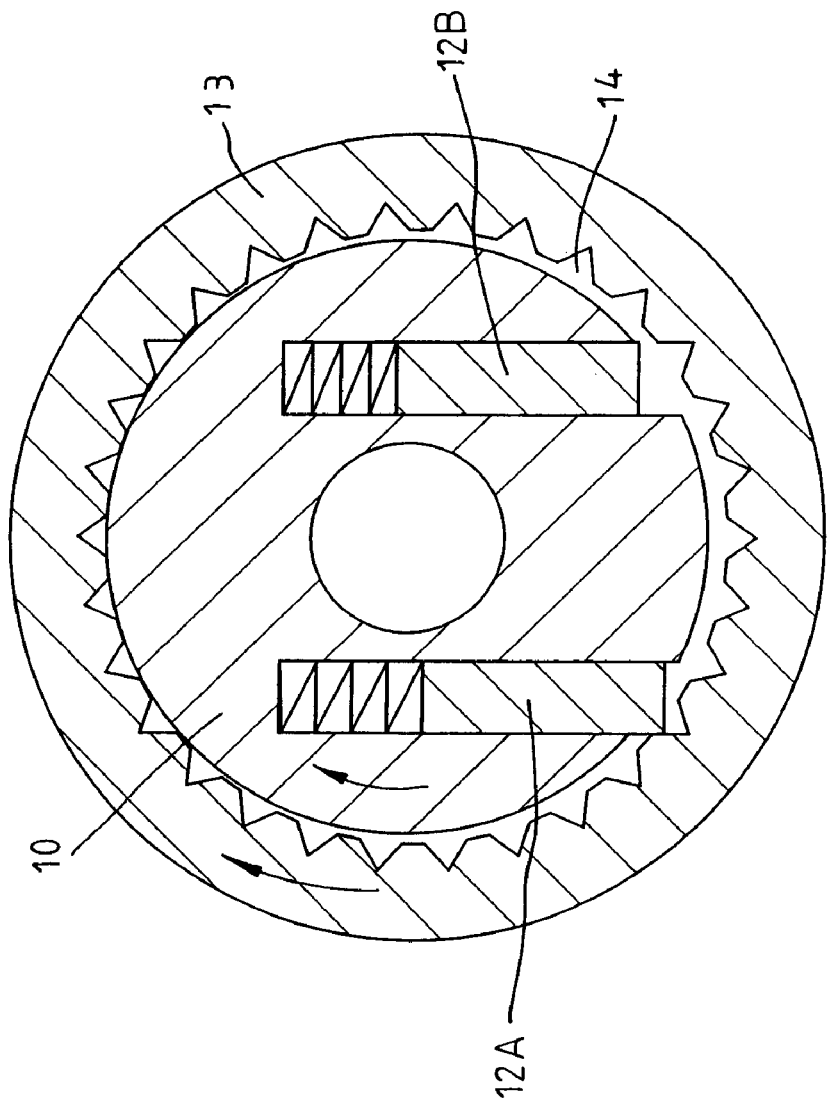
FIG. 3C shows a schematic view of the ratchet main body of the prior art ratchet device in clockwise operation.
Figure 4A:
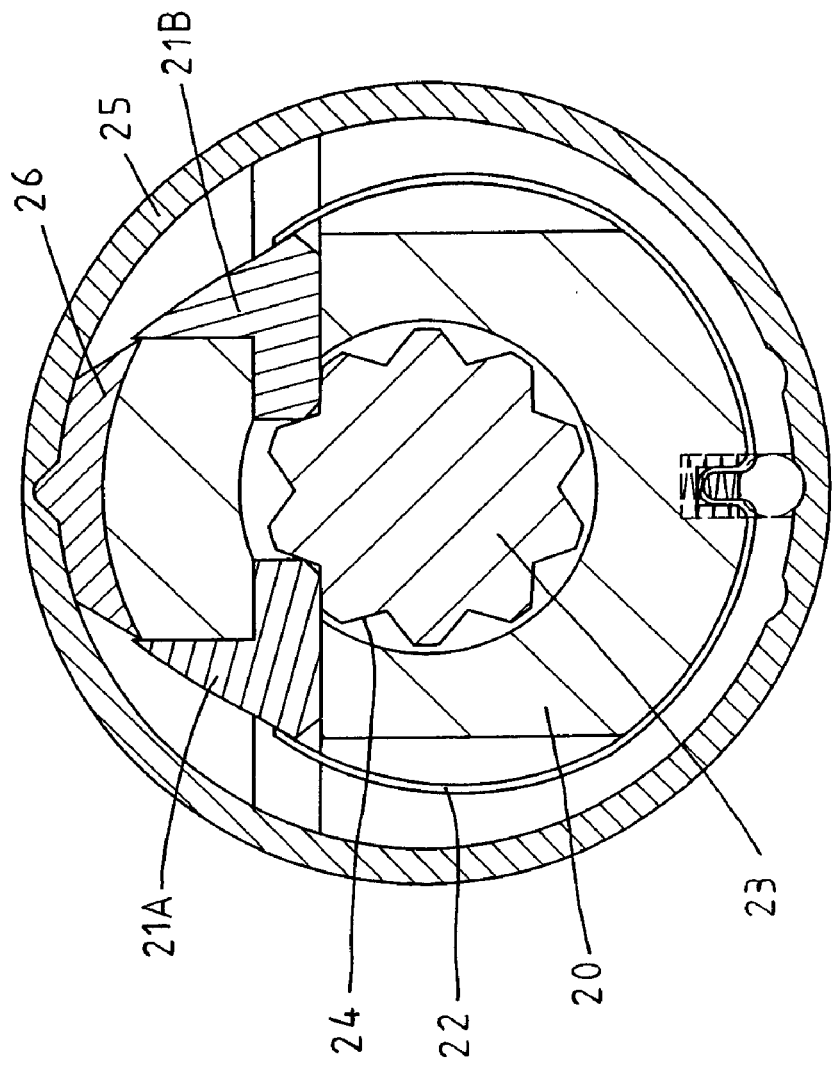
FIGS. 4A–4C are schematic views of the ratchet control of a ratchet screwdriver of the Taiwan Patent Serial Number 88218399.
Figure 4B:
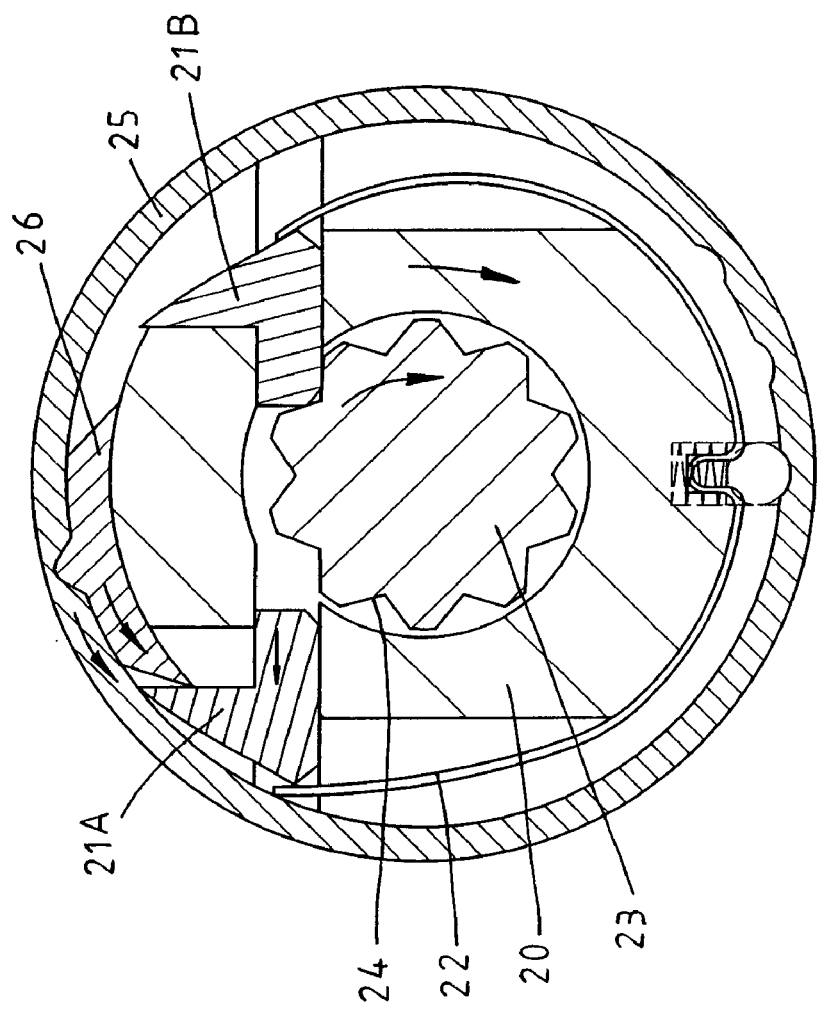
Figure 4C:
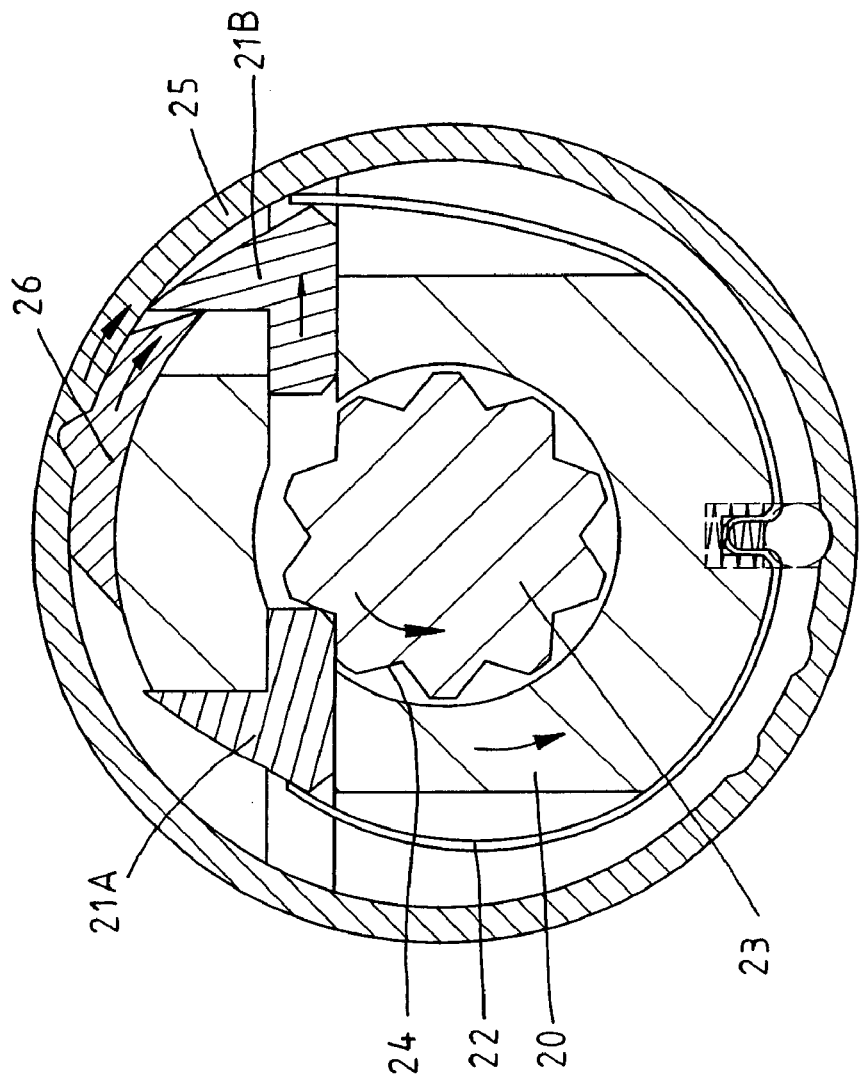
Figure 5:
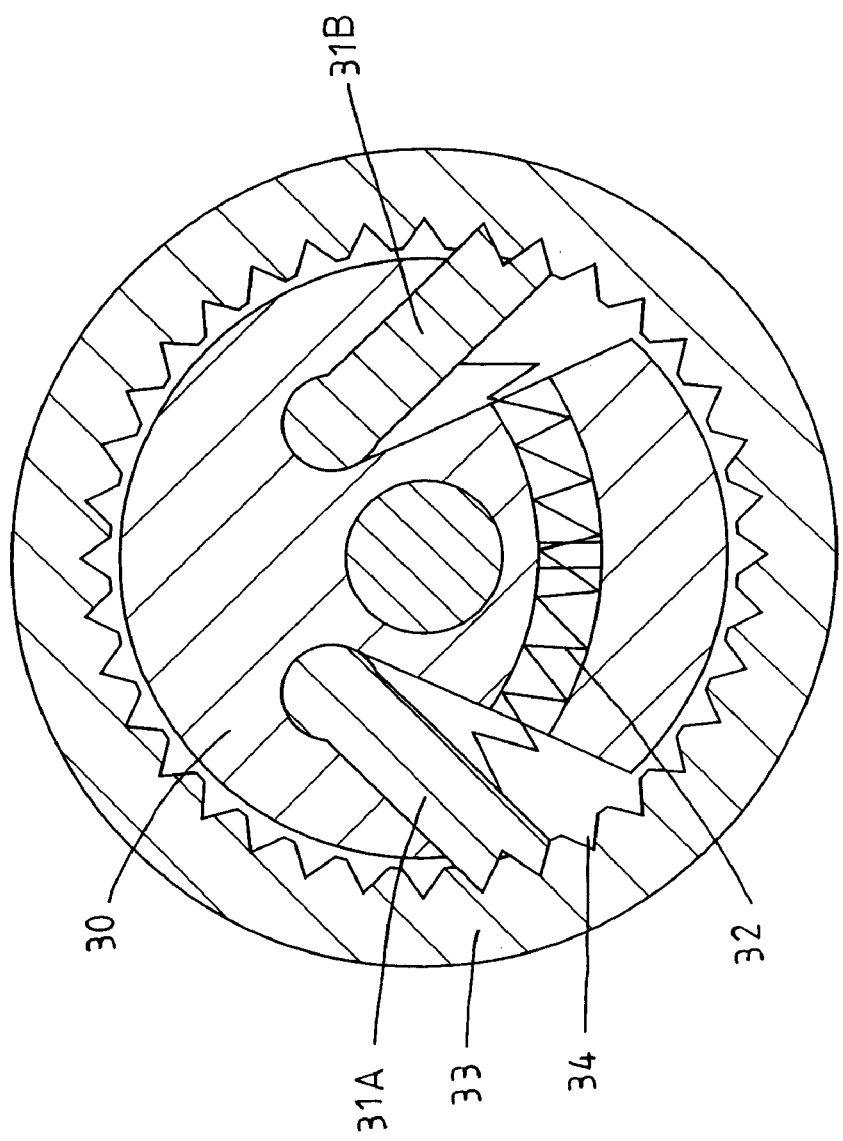
FIGS. 5A–5C are schematic views of the ratchet control of a ratchet handle structure of the Taiwan Patent Serial Number 91220384.
Figure 5B:
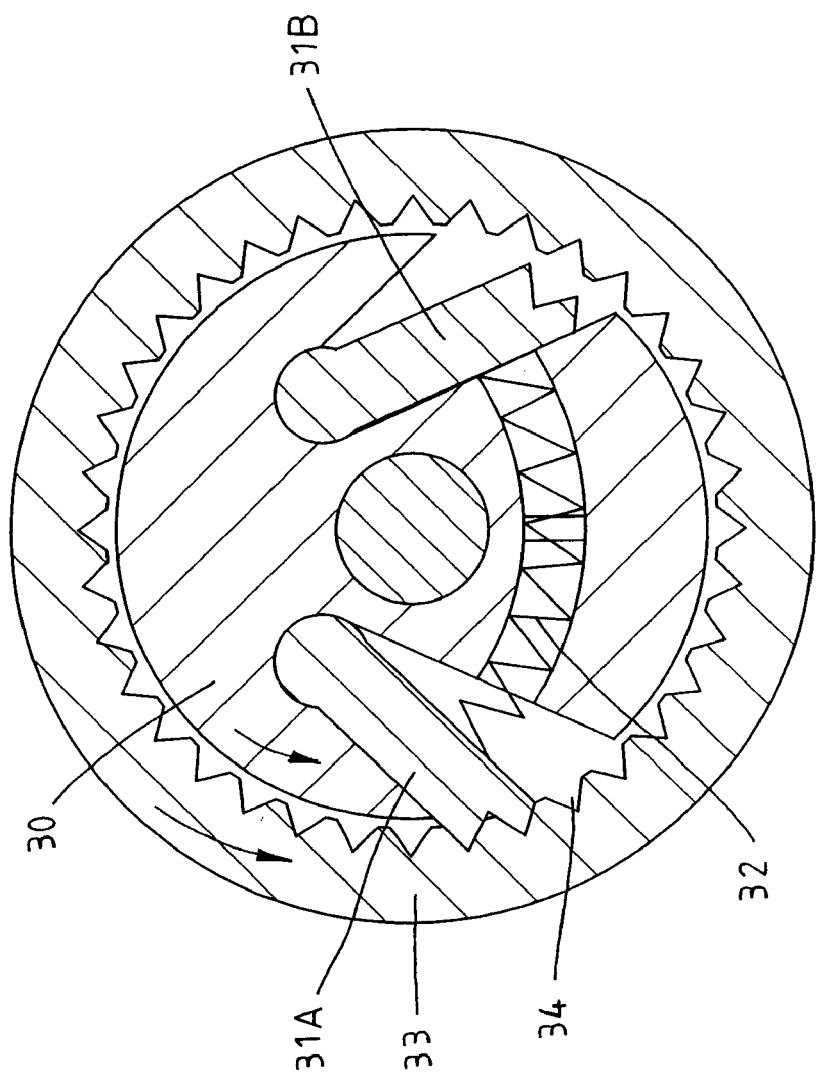
Figure 5C:
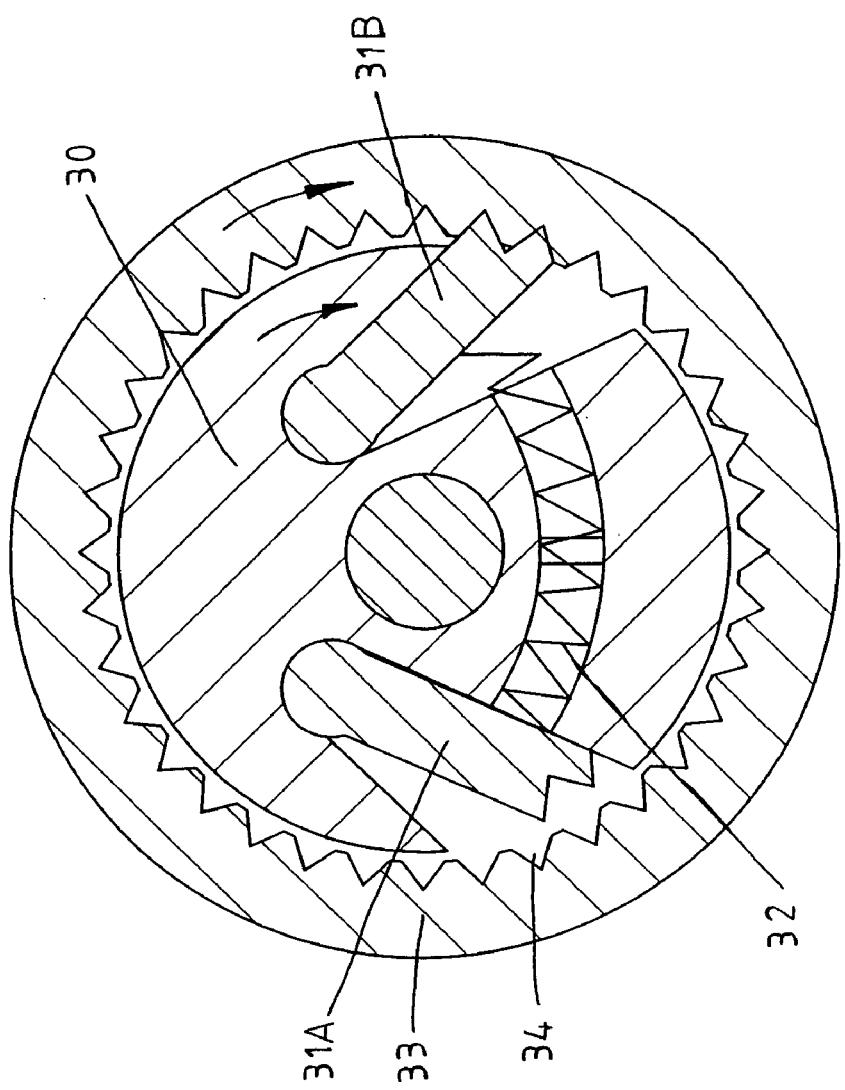
Figure 6:
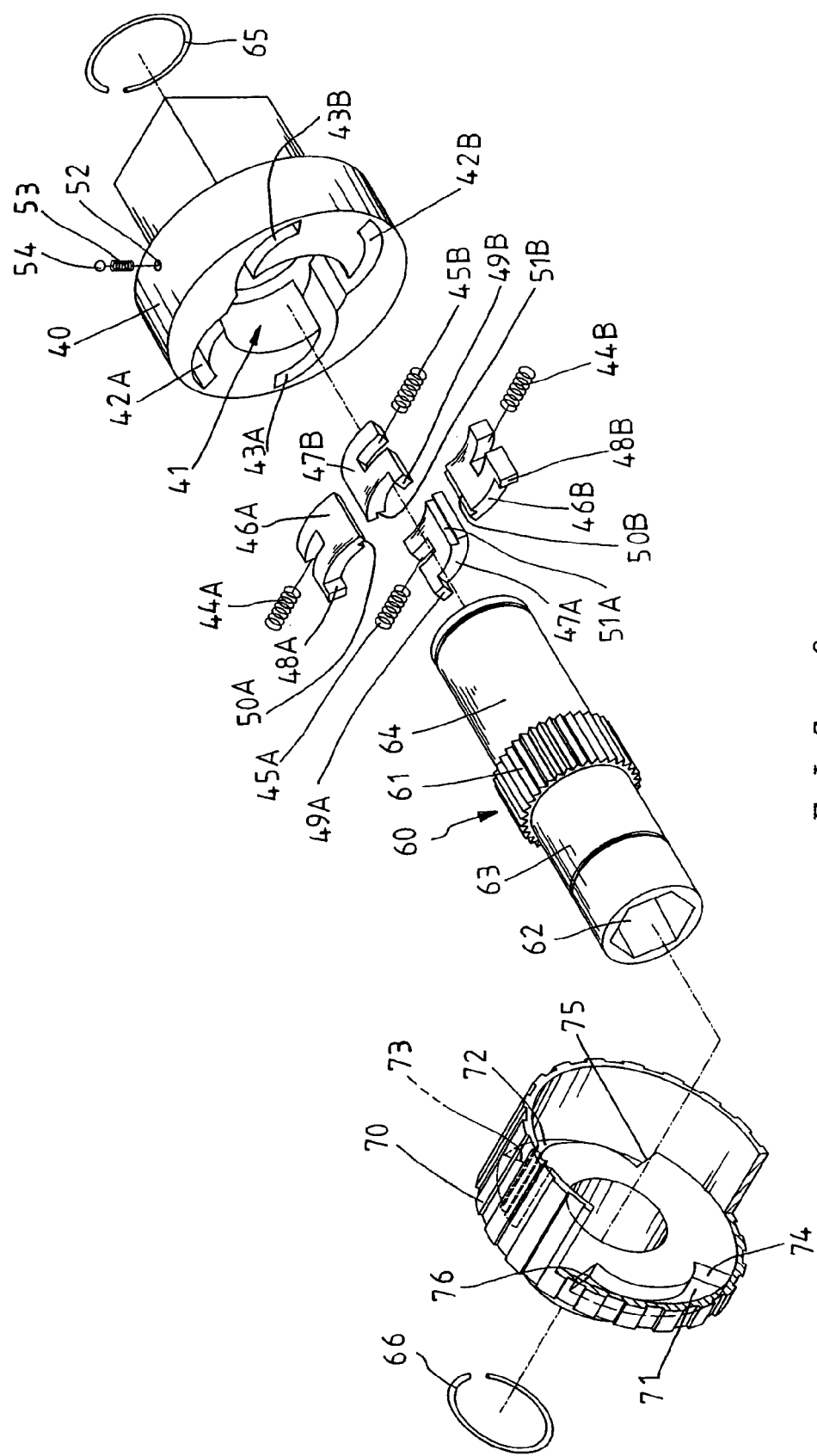
FIG. 6 shows an exploded view of a first preferred embodiment of the present invention.
Figure 7:
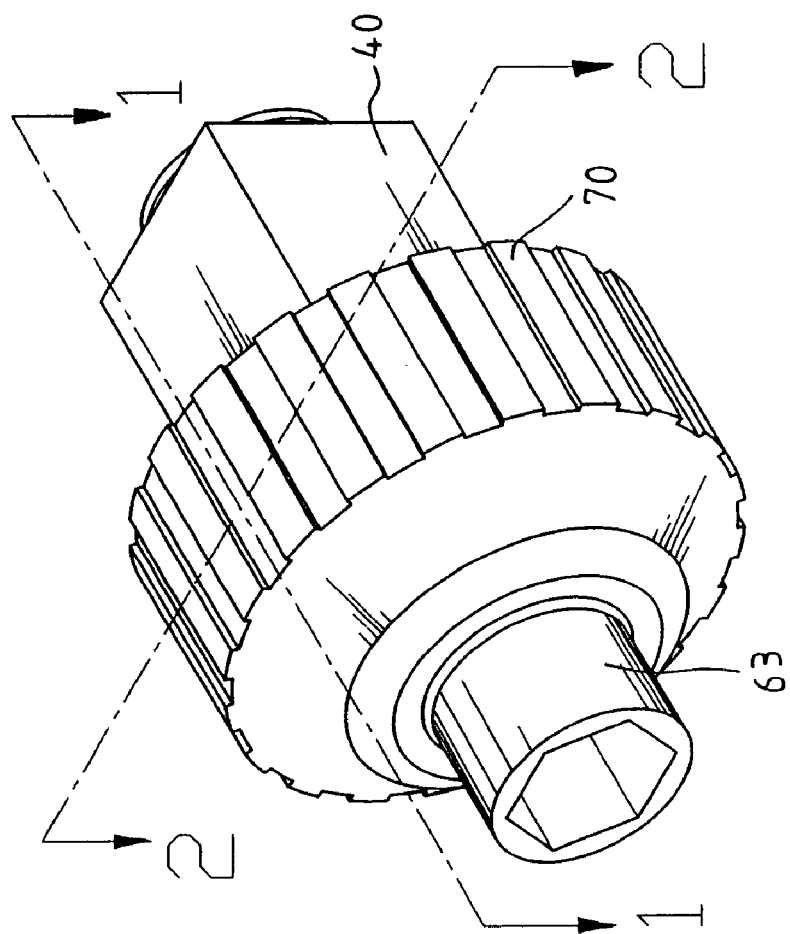
FIG. 7 shows a perspective view of the first preferred embodiment of the present invention in combination.
Figure 8:
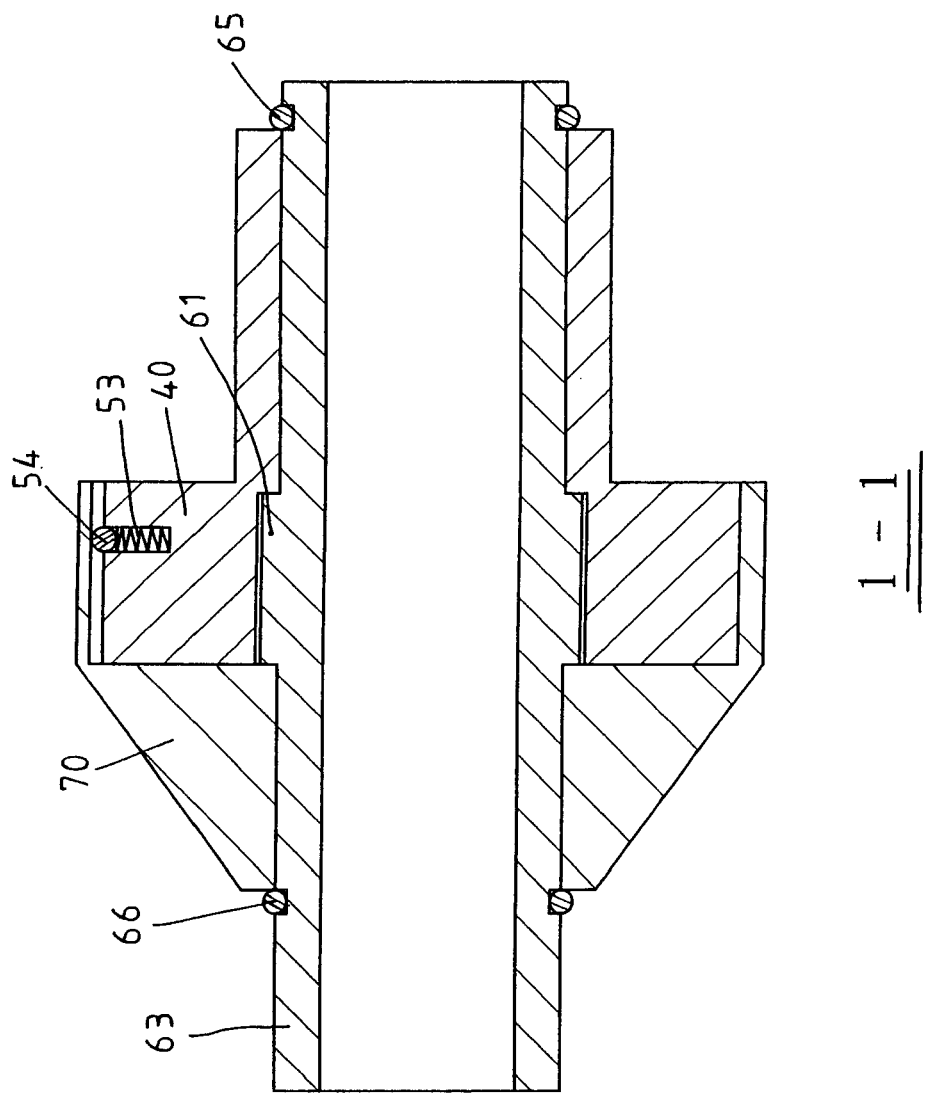
FIG. 8 shows a sectional view taken along the direction indicated by a line 1—1 as shown in FIG. 7.

As shown in FIGS. 6–9, a ratchet device embodied in the present invention comprises a control body 40, a ratchet body 60, and a shifter 70.

The control body 40 is provided in the center with an axial hole 41 and is further provided in proximity of the axial hole 41 with a first set of arcuate grooves 42A and 42B symmetrical to the arcuate groove 42A, and a second set of arcuate grooves 43A and 43B symmetrical to the arcuate groove 43A. The groove 42A is used to dispose a spring 44A and a pawl 46A. Similarly, a spring 44B and a pawl 46B are disposed in the arcuate groove 42B. A spring 45A and a pawl 47A are disposed in the arcuate groove 43A. A spring 45B and a pawl 47B are disposed in the arcuate groove 43B. The pawls 46A, 46B, 47A, and 47B are provided at one end with an actuation projection 48A, 48B, 49A, 49B. The actuation projections are jutted out of the control body 40. The pawls 46A and 46B are respectively provided with a tongue 50A, 50B. The diagonal line of the tongue 50A or 50B passes a central axial line of the control body 40. Similarly, the symmetrical pawls 47A and 47B of the second set are respectively provided with a tongue 51A, 51B. The diagonal line of the tongue 51A or 51B passes the central axial line of the control body 40. The control body 40 is further provided with a slot 52 in which a spring 53 and a ball 54 are disposed.

The ratchet body 60 is formed of a toothed portion 61, a tip portion 63 extending from one end of the toothed portion 61 and having a socket 62 that fits over a nut or bolt of a specific size and shape, and a connection portion 64 extending from other end of the toothed portion 61. The connection 64 is held securely in the axial hole 41 of the control body 40 in conjunction with a locking ring 65, with the toothed portion 61 being engageable with the pawls 46A, 46B, 47A, and 47B.

The shifter 70 is joined with the control body 40 in conjunction with a locking ring 66. The shifter 70 is provided with two retaining slots 71 and 72. The retaining slot 71 has two end faces 74 and 76, while the retaining slot 72 has two end faces 73 and 75. These end faces are used to push the actuation projections 48A, 48B, 49A, and 49B of the pawls 46A, 46B, 47A, and 47B. When the actuation projections are pushed by the end faces of the shifter 70, the springs 44A, 44B, 45A, and 45B are compressed by the pawls. In the meantime, the springs are caused to displace along the arcuate grooves 42A, 42B, 43A, 43B.

Figure 10A:
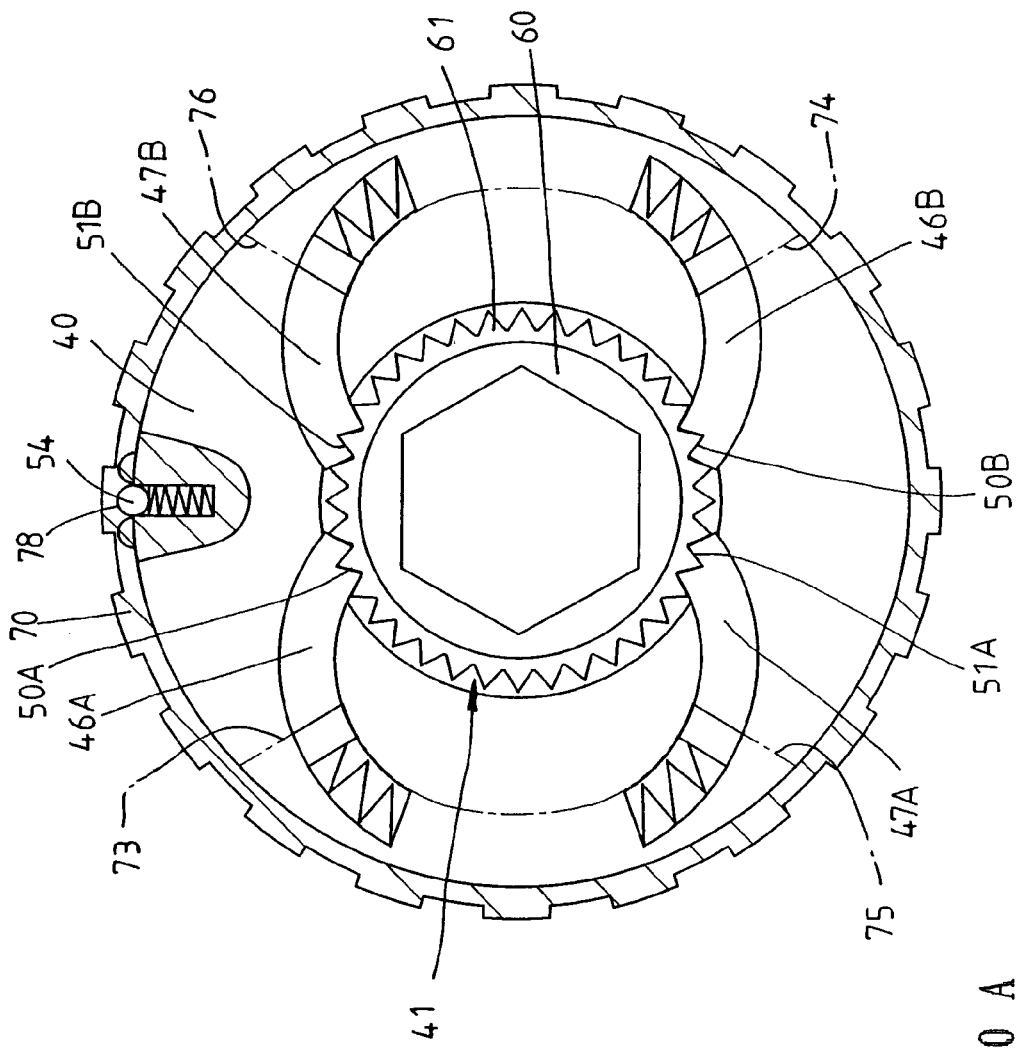
FIGS. 10A–10C are sectional schematic views of the first preferred embodiment of the present invention at work.
Figure 10B:
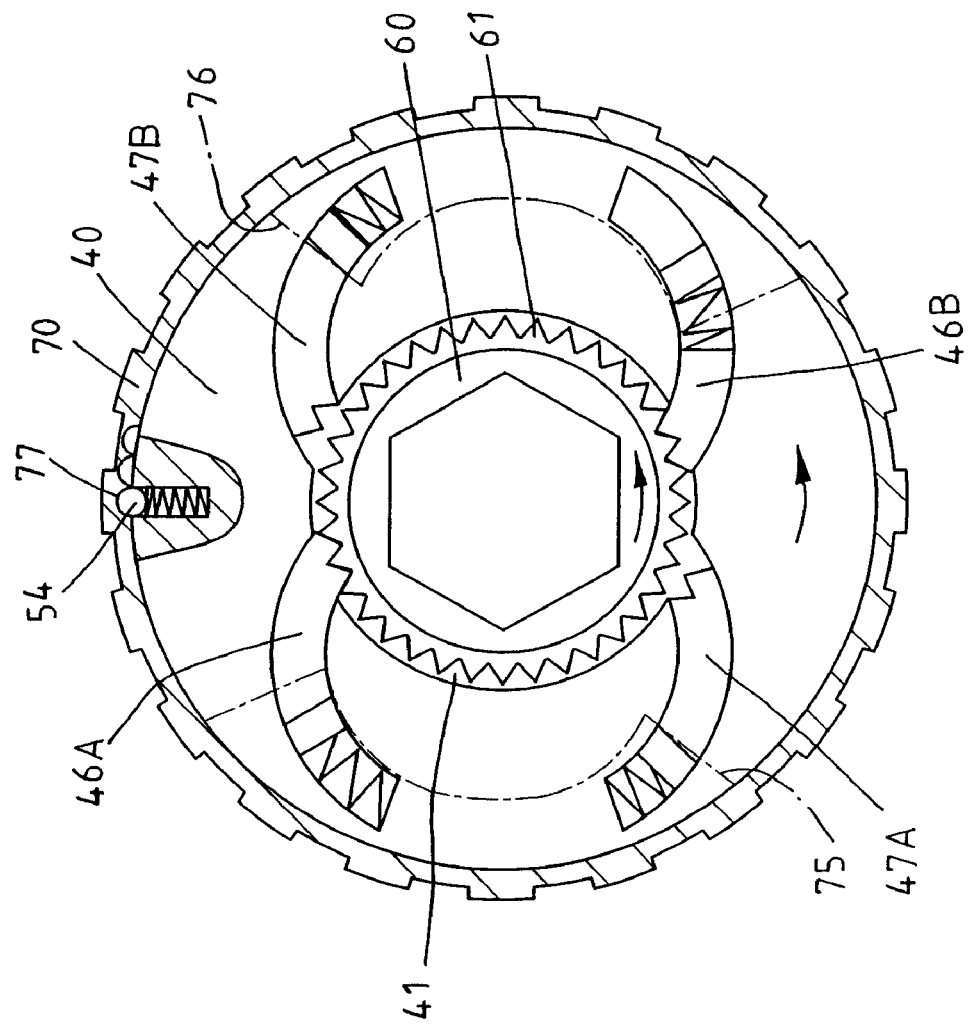
Figure 10C:
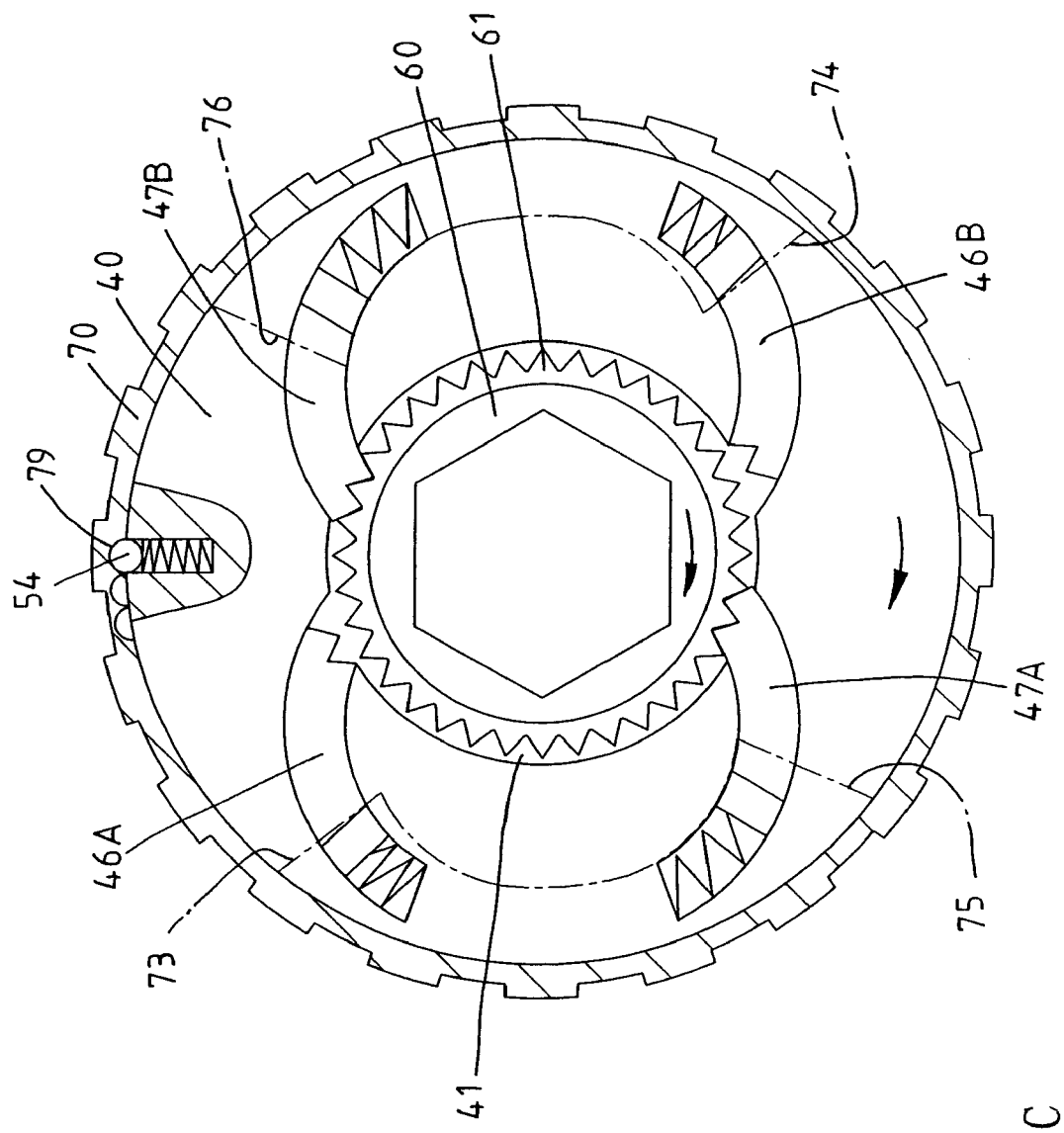

As shown in FIGS. 10A, 10B, and 10C, the shifter 70 is further provided with three locating slots 77, 78, and 79, which are intended to locate the ball 54 of the control body 40.

Figure 9:
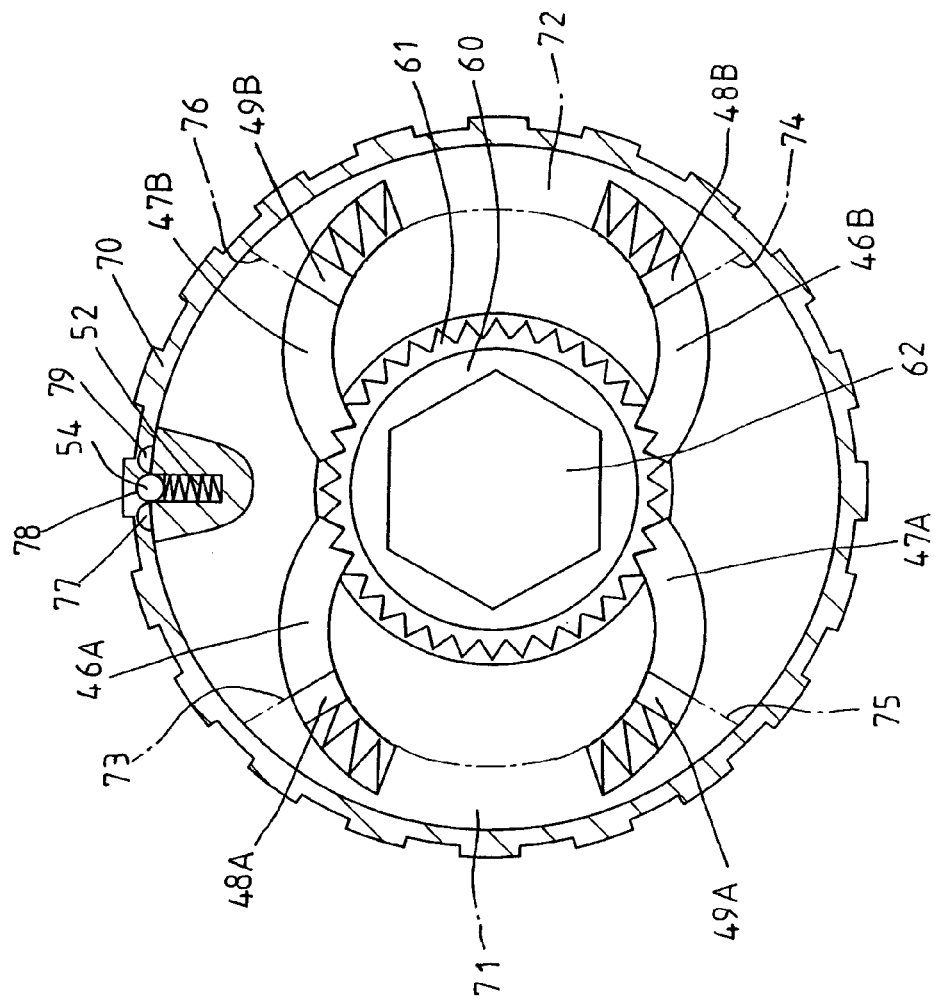
FIG. 9 shows a sectional view taken along the direction indicated by a line 2—2 as shown in FIG. 7.

As illustrated in FIGS. 9 and 10A, the ball 54 of the control body 40 is located in the second locating slot 78 of the shifter 70. The tongues 50A, 50B, 51A, and 51B of the pawls are simultaneously engaged with the toothed portion 61 of the ratchet body 60. As the shifter 70 is turned counterclockwise, as shown in FIG. 10B, the ball 54 is located in the first locating slot 77 of the shifter 70. Meanwhile, the end faces 75 and 76 of the shifter 70 push the pawls 47A and 47B to disengage the toothed portion 61 of the ratchet body 60. The pawls 46A and 46B remain in the engagement state. If the control body 40 is turned counterclockwise, the ratchet body 60 is actuated to turn along with the control body 40. If the control body 40 is turned counterclockwise, a reverse idling is resulted.

As shown in FIG. 10B, when the control body 40 and the ratchet body 60 are turned counterclockwise, two pawls 46A and 46B are engaged with the toothed portion 61 of the ratchet body 60. Meanwhile, other two pawls 47A and 47B are disengaged with the toothed portion 61 of the ratchet body 60. If the control body 40 and the ratchet body 60 are turned clockwise, as shown in FIG. 10C, the two pawls 46A and 46B are disengaged with the toothed portion 61 of the ratchet body 60. In the meantime, the other two pawls 47A and 47B are engaged with the toothed portion 61 of the ratchet body 60. In other words, the ratchet body 60 is always held securely in the axial hole 41 of the control body 40 by two symmetrical pawls at the time when the ratchet body 60 is turned clockwise or counterclockwise. These two symmetrical pawls serve to enhance the torsion of the ratchet body 60. Accordingly, the tooth number of the toothed portion 61 of the ratchet body 60 of the ratchet device of the present invention may be so increased as to allow a greater rotational angle of the ratchet body 60 at the time when the ratchet body 60 is engaged in a reverse idling, thereby resulting in enhancement of ratcheting stroke. As a result, the ratchet device of the present invention is adapted to operate in a situation in which a limited space is available for maneuvering a hand tool.

As shown in FIG. 11, the ratchet device of the present invention is incorporated into a ratchet screwdriver such that the control body 40 is fastened with a handle 80 of the ratchet screwdriver, and that the tip portion 63 of the ratchet body 60 is fitted with a tip 81 of the ratchet screwdriver.

Figure 12:
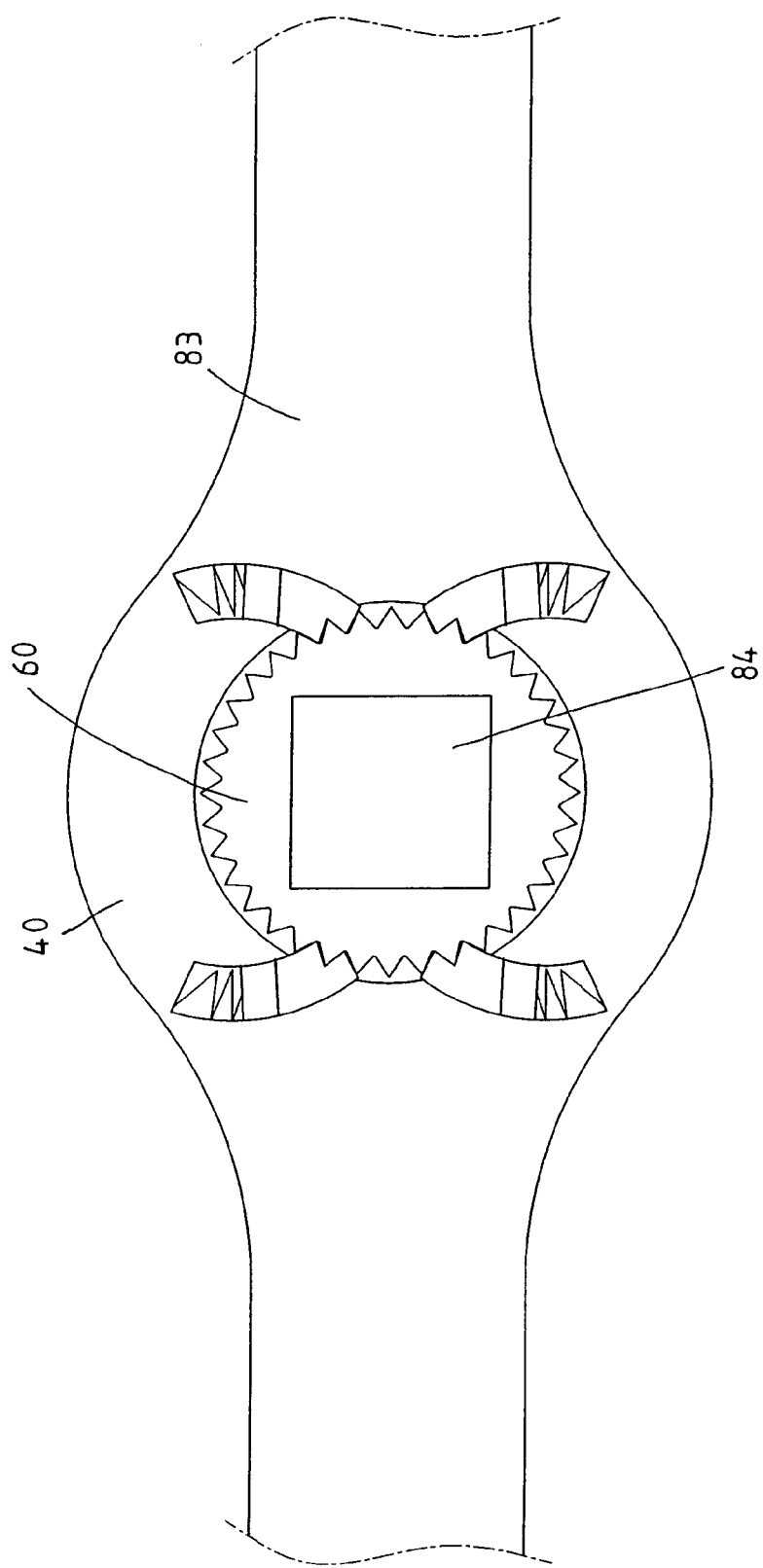
FIG. 12 shows a schematic view of a socket wrench in conjunction with the first preferred embodiment of the present invention.

As shown in FIG. 12, the ratchet device of the present invention is incorporated into a socket wrench 83 which is provided with a socket 84 located at the center of the ratchet body 60 of the ratchet device of the present invention.

Figure 13:
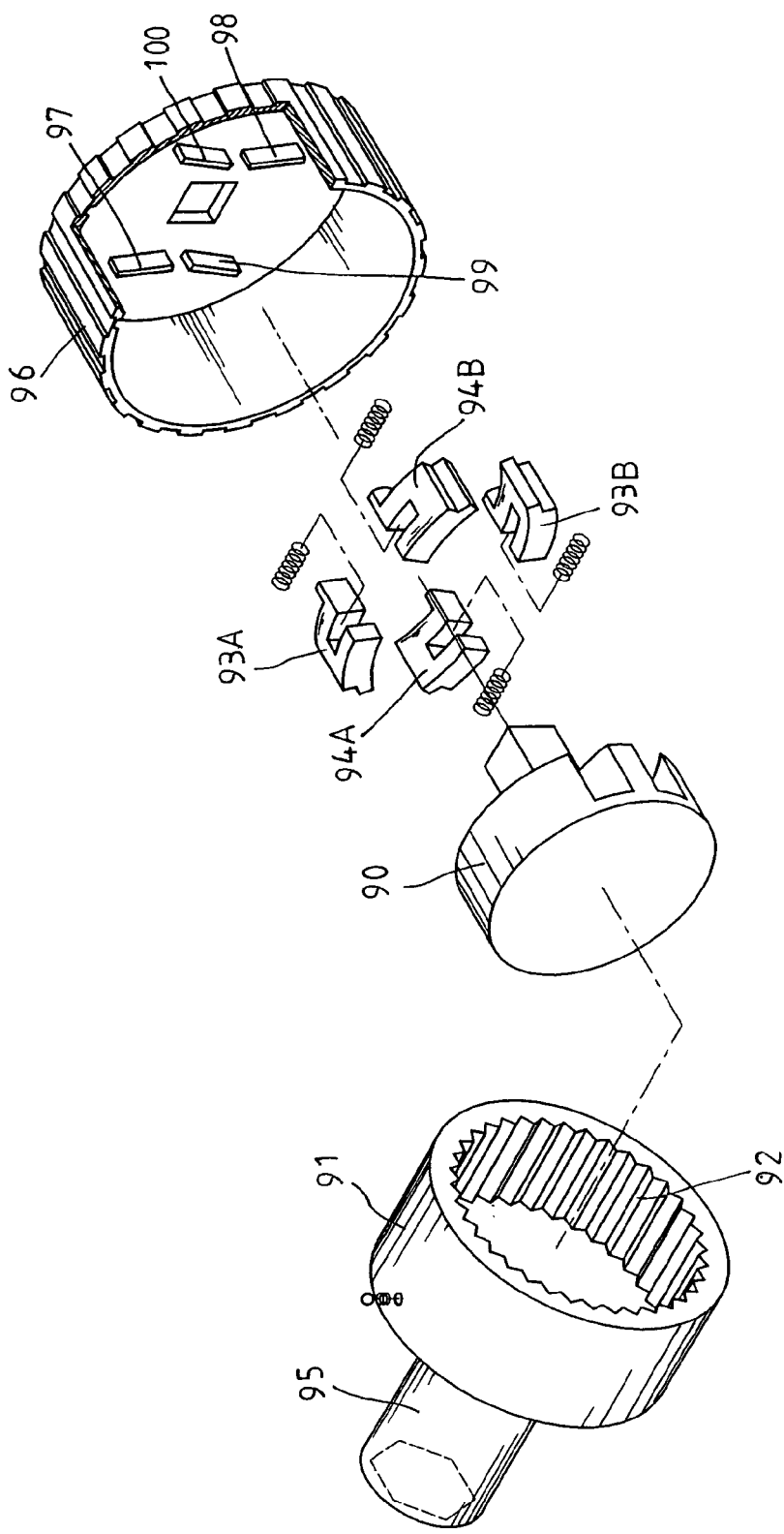
FIG. 13 shows an exploded view of a second preferred embodiment of the present invention.
Figure 14:
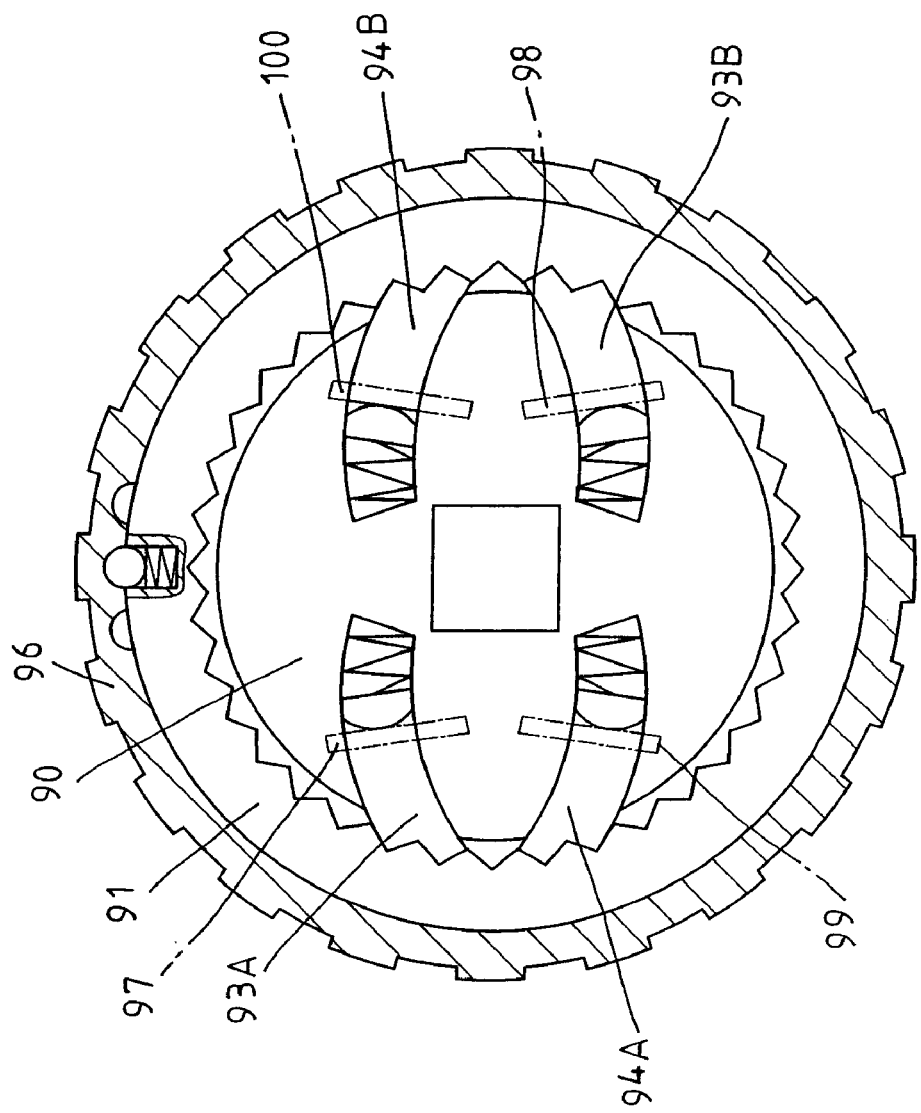
FIG. 14 shows a sectional schematic view of the second preferred embodiment of the present invention in combination.

As shown in FIGS. 13 and 14, a ratchet device of the second preferred embodiment of the present invention comprises a control body 90, which is disposed in the interior of a ratchet body 91. The ratchet body 91 is provided in the inner wall with a toothed portion 92. The control body 90 is provided with two sets of symmetrical pawls 93A, 93B, 94A, 94B. The ratchet body 91 is provided with a tip portion 95 for fitting with the tip of hand tool. The ratchet body 91 is fitted into a shifter 96 which is provided with four actuation elements 97, 98, 99, and 100 for actuating four pawls 93A, 93B, 94A, and 94B. The ratchet device of the second preferred embodiment of the present invention is thus capable of providing a sufficient torsional force by which a workpiece is caused to rotate. In addition, the tooth number of the toothed portion 92 of the ratchet body 91 may be increased to facilitate the maneuvering of the ratchet device in a confined space.

The embodiments of the present invention described above are to be regarded in all respects as being illustrative and nonrestrictive. Accordingly, the present invention may be embodied in other specific forms without deviating from the spirit thereof. The present invention is therefore to be limited only by the scopes of the following claims.

What is claimed is:

1. A ratchet device comprising:
   a control body provided with an axial hole, two sets of symmetrical grooves located in proximity of said axial hole, and two sets of symmetrical arresting members disposed in said symmetrical grooves;
   a ratchet body provided with a toothed portion and disposed rotatably in said axial hole of said control body in such a manner that said toothed portion is engaged with said symmetrical arresting members; and
   a shifter provided with four actuation elements and joined with said control body such that said actuation elements are corresponding in location to said symmetrical arresting members;
   wherein said control body is provided with a slot, a spring disposed in said slot, and a ball disposed in said slot, and said shifter is provided with a plurality of locating slots for locating said ball of said control body.

2. The ratchet device as defined in claim 1, wherein said arresting members of said control body are formed of a pawl and a spring.

3. The ratchet device as defined in claim 2, wherein said pawl is provided at one end with an actuation projection corresponding in location to one of said actuation elements of said shifter, and at other end with a tongue engageable with said toothed portion of said ratchet body.

4. The ratchet device as defined in claim 1, wherein said symmetrical arresting members are disposed in said symmetrical grooves of said control body in such a way that the diagonal line of an arresting end of said arresting members passes a central axial line of said control body.

5. The ratchet device as defined in claim 1, wherein said ratchet body is further provided with a tip portion and a connection portion, with said tip portion being extended from one end of said toothed portion and having a socket, said connection portion being extended from other end of said toothed portion and located in said control body.

6. The ratchet device as defined in claim 1, wherein said actuation elements of said shifter are provided with a retaining slot whereby said retaining slot has two end faces corresponding in location to two of said symmetrical arresting members.

7. The ratchet device as defined in claim 1, wherein said shifter is securely joined with said control body in conjunction with a locking ring.

8. A ratchet device comprising: a control body provided with two sets of arresting members symmetrical to each other;
   a ratchet body provided with a toothed portion and fitted over said control body such that said toothed portion is engaged with said arresting members of said control body; and
   a shifter provided with four actuation elements and fitted over said ratchet body such that said actuation elements are corresponding in location to said arresting members of said control body;
   wherein said control body is provided with a slot, a spring disposed in said slot, and a ball disposed in said slot; wherein said shifter is provided with a plurality of locating slots for locating said ball of said control body.

9. The ratchet device as defined in claim 8, wherein said ratchet body is provided with a tip portion extending from one end of said toothed portion whereby said tip portion is used to fit the tip of a tool.

* * * * *